United States Patent [19]

Evans et al.

[11] Patent Number: 4,821,485
[45] Date of Patent: Apr. 18, 1989

[54] CONTINUOUSLY ROTATING PLATFORM WITH MULTIPLE MOUNTED DOUBLE CLIPPERS FOR CONTINUOUSLY FORMING LINK PRODUCT

[75] Inventors: Alfred J. Evans, Raleigh; Grant K. Chen, Cary; Dennis J. May, Pittsboro; Edward P. Brinson, Raleigh, all of N.C.

[73] Assignee: Delaware Capital Formation, Inc., Apex, N.C.

[21] Appl. No.: 105,665

[22] Filed: Oct. 7, 1987

[51] Int. Cl.⁴ .................. B65B 9/15; B65B 51/05
[52] U.S. Cl. .................. 53/138 A; 53/576; 29/243.57; 17/33
[58] Field of Search .............. 53/138 A, 550, 576; 29/243.57, 243.56; 17/33, 34

[56] References Cited

U.S. PATENT DOCUMENTS

| | | | |
|---|---|---|---|
| 3,783,583 | 1/1974 | Dobbert | 53/138 A |
| 4,109,363 | 8/1978 | Velarde | 53/138 A |
| 4,189,897 | 2/1980 | Ailey, Jr. | 53/512 X |
| 4,249,364 | 2/1981 | Kawasaki | 53/550 |
| 4,305,240 | 12/1981 | Grevich | 53/550 X |
| 4,578,928 | 4/1986 | Andre | 53/512 |

Primary Examiner—John Sipos
Attorney, Agent, or Firm—Allegretti & Witcoff, Ltd.

[57] ABSTRACT

An improved packaging device designed for the filling of flexible, tubular casing and for the sealing of the casing in discreet lengths which may then be further processed or packaged. The device includes a mounting assembly having a floor mounted frame with a rotatable platform supported by the frame. Adjacent the frame and platform is a device for feeding product through a product horn into casing which is shirred on the horn. The platform includes a plurality of specially designed clippers arranged in a circular array. As filled casing is discharged from the feeding mechanism it is directed tangentially into the circular array of rotating clippers which are equally spaced from each other. The clippers sequentially operate to gather the casing, apply spaced, double clips to the casing, sever the connection between adjacent clips, and to then discharge the packaged link from the device.

19 Claims, No Drawings

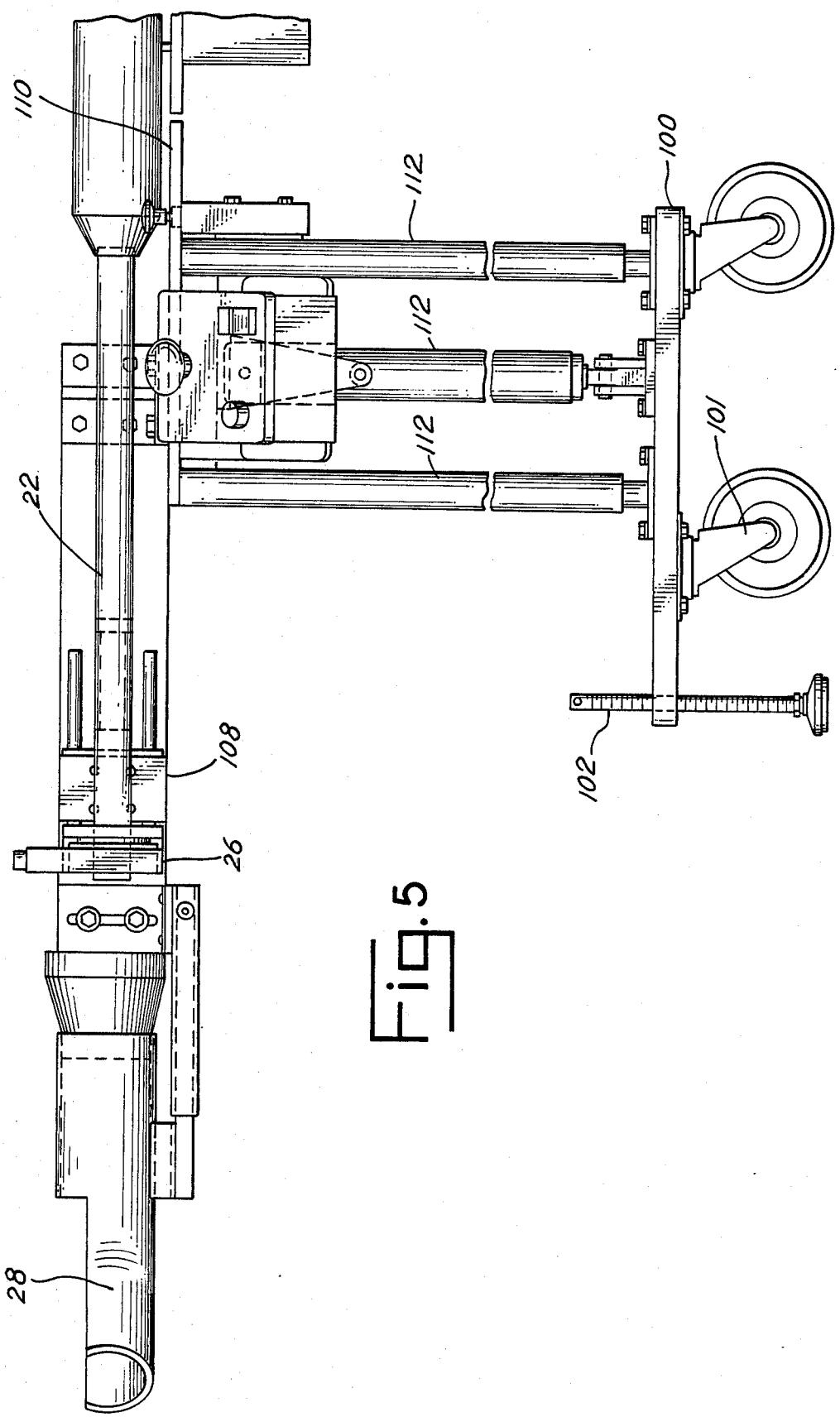

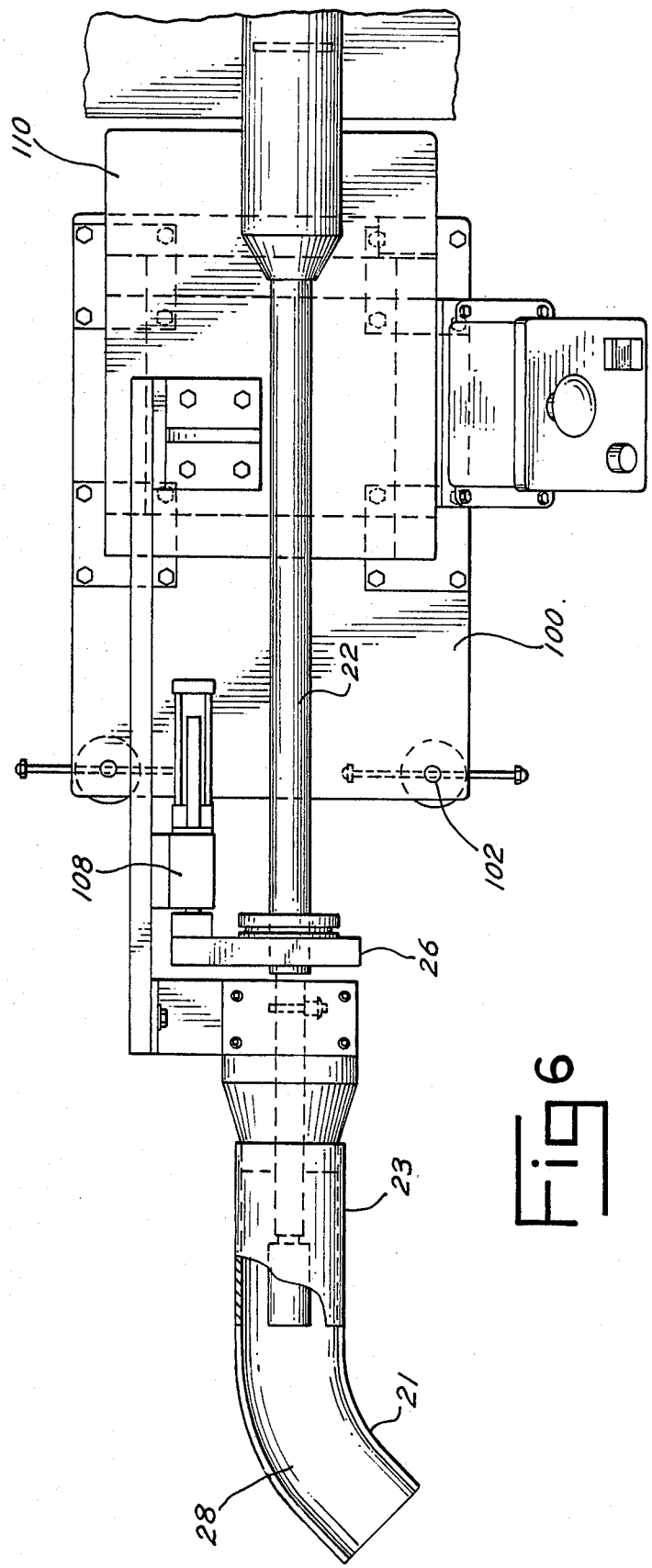

CONTINUOUSLY ROTATING PLATFORM WITH MULTIPLE MOUNTED DOUBLE CLIPPERS FOR CONTINUOUSLY FORMING LINK PRODUCT

BACKGROUND OF THE INVENTION

This invention relates to an improved packaging device for filling tubular casing with products such as sausage or cheese and for attaching double metal clips to the casing at intervals thereby enclosing or sealing the product in link form.

Various food products, such as sausage or cheese, are packaged in tubular casing by attaching metal clips at spaced intervals thereby sealing and closing product within the casing. Klenz in Pat. No. 3,383,754 issued May 21, 1968 discloses a device especially adapted for applying U-shaped metal clips about casing. Specifically, Klenz teaches the use of a punch for driving a U-shaped metal clip down a channel against a die to thereby form the clip about gathered casing retained at the bottom of the clip channel.

Klenz in Pat. No. 3,543,378 discloses the use of a pair of clippers arranged in tandem and cooperative with opposed movable casing gathering plates that define a pair of clip channels. The gathering plates move in opposition to each other to gather casing material into a constricted form or mass. Two U-shaped metal clips are then driven by punches about the gathered casing to seal the ends of the casing. A knife then cuts the casing between the clips to thereby separate the links defined by the clipped casing. Klenz in Pat. No. 3,583,056 discloses another clip attachment apparatus wherein a movable jaw pivots against a fixed jaw to gather the casing in a constricted region prior to attachment of a clip about the casing. Other patents disclose various combinations of gathering mechanisms for gathering casing prior to attachment of a clip or clips including Dobbert in Pat. No. 3,783,583, Velarde in Pat. No. 4,001,926, and Velarde in Reissue Pat. No. 30,196.

To increase the efficiency and utility of such clipping devices, it has been suggested in Andre Pat. No. 3,795,085 to mount a single clipper at a work station of a rotating table. A filled bag or casing which is to be clipped is placed on a nozzle at a first work station associated with the table. The casing material is then clamped as the table rotates to a second work station. Air in the casing is then evacuated through a vacuum system at a third station and ultimately, upon further rotation of the table to the clip work station, a clip is attached to the casing to seal the casing.

Andre in Pat. No. 4,578,928 discloses yet another variation on this theme wherein a circular table is provided for gathering casing material fitted about a product and evacuating the casing material before finally placing a clip about the gathered casing material at a final work station. Ailey Pat. No. 4,189,897 discloses a packaging device wherein product is placed in casing material and the material is then gathered and clipped by means of a U-shaped metal clip. The '897 patent discloses a continuous line operation device having a series of stations placed on an endless belt with means provided for each station to evacuate the casing, gather the casing, and attach a clip thereto.

While the aforesaid devices have been useful, there has remained a need for a high speed continuously operable packaging device for attachment of metal clips to generally cylindrical, continuously filled casing. Such a need has been particularly acute with respect to the desire to form links of casing of variable length and diameter without major adjustment or alteration in the operation and configuration of the packaging device. Objectives of this general nature led to the development of the present machine which is especially useful for the manufacture of chubs and other sausage and link-type products having a wise variety of length and diameter.

SUMMARY OF THE INVENTION

In a principal aspect, the present invention comprises an improved packaging device designed for the filling of tubular, flexible casing and for the sealing of the casing in discreet lengths. Specifically, the device includes a mounting assembly having a floor mounted frame with a rotatable platform supported by the frame. Adjacent the frame and platform is a device or mechanism for feeding product through a product horn into tubular casing which is released from over the horn through a brake mechanism. The platform includes a plurality of specially designed clippers arranged in a circular pattern on the top of the platform. As filled casing is discharged from the feeding mechanism it is directed tangentially into the circular array of clippers. The clippers are equally spaced from one another on the circumference of a circle on the platform. The clippers sequentially operate to gather the casing, apply spaced U-shaped metal clips to the casing, sever the connection between adjacent clips, and to then discharge the packaged link from the device.

Thus, it is an object of the invention to provide an improved packaging device for filling flexible, tubular casing.

A further object of the invention is to provide a improved packaging device for filling flexible, tubular casing and for attachment of a U-shaped metal clips thereto to define discrete links of product.

Yet a further object of the invention is to provide a continuously operating packaging device which is adapted to receive generally cylindrical or tubular casing material as it is continuously filled by flow of product through a horn having shirred casing thereon. The shirred casing passes through a brake assembly to control the size and weight of the product.

Yet another object is to provide a platform having a plurality of clippers radially spaced about a pivot axis for the platform wherein the distance between the clippers and thus the radial distance of a clipper from the axis of rotation is adjustable.

Yet a further object of the invention is to provide an improved clipper which includes a special carriage and gate construction for gathering casing material prior to attachment of a clip thereto.

Yet a further object of the invention is to provide a packaging device which is capable of manufacturing a wide range of lengths of link product.

Yet a further object of the invention is to provide an improved packaging device including a plurality of clippers for the attachment of U-shaped metal clips to casing, said device having a simplified construction and high speed operation relative to prior art packaging devices.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 5 is a side elevation of the means for feeding casing material associated with the packaging device of the invention; and FIG. 6 is a top plan view of the means for feeding shown in FIG. 5.

DESCRIPTION OF THE PREFERRED EMBODIMENT

General Description

Figure 1:
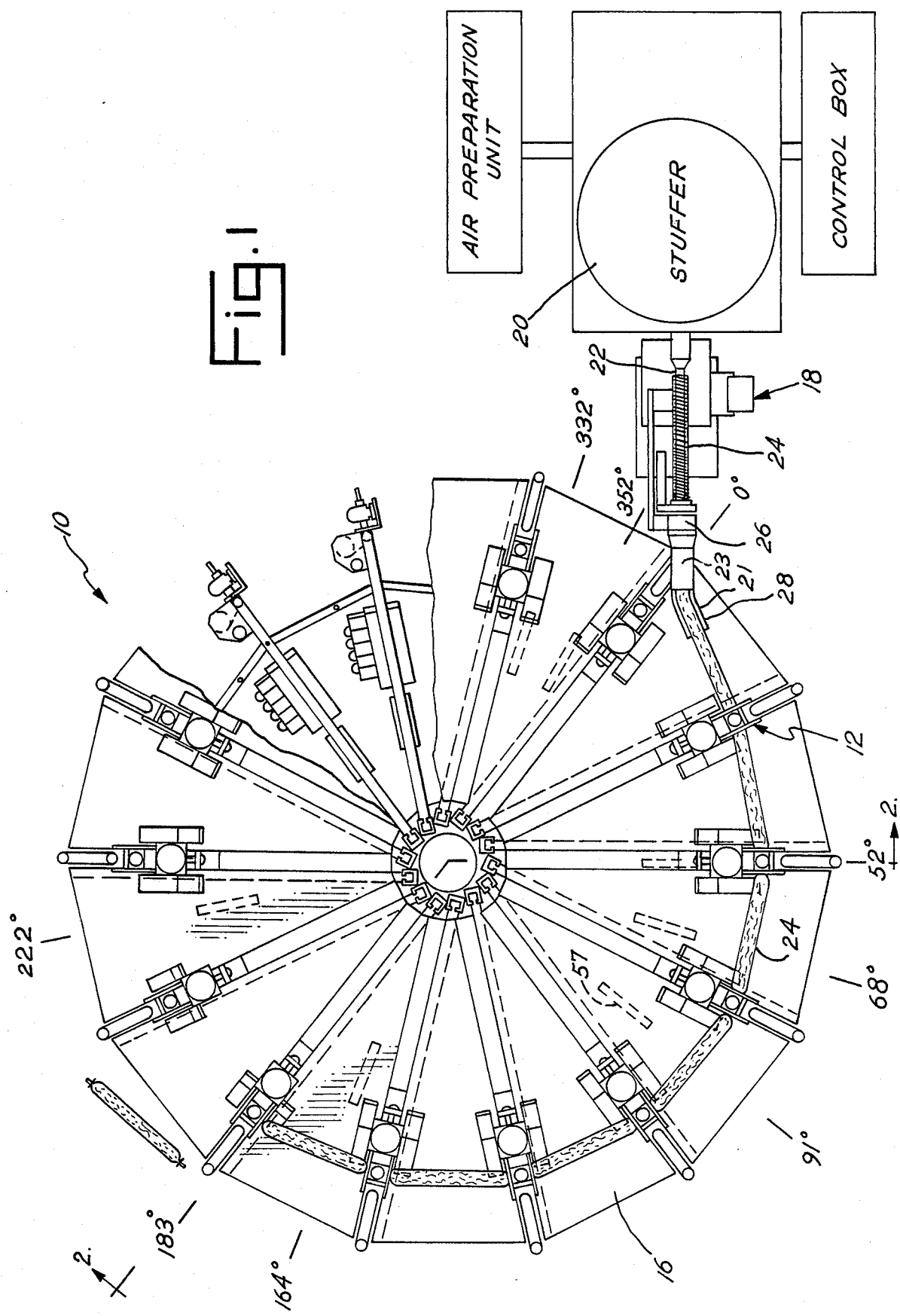
FIG. 1 is a top plan schematic of the improved packaging device of the invention.

FIG. 1 is a schematic top plan view of the improved packaging device of the invention. The device generally includes a mounting assembly 10 having supported thereon a plurality of clippers 12. As depicted, each clipper 12 is normally positioned at an equal radial distance from a vertical rotation axis 14 associated with a platform 16 of assembly 10. The device also includes a casing feed mechanism or construction 18 which receives food product, such as sausage, from a stuffing machine 20. The product is directed through a stainless steel tube or horn 22 associated with the casing feed mechanism 18 and into casing 24 which is shirred on the horn 22. As the casing 24 is filled by discharge of product from the horn 22, the casing is restrained by a brake 26. The filled casing 24 is then directed by a chute or channel 28 in a generally tangential direction with respect to the clippers 12 and the in the direction of rotation of the platform 16 as indicated by the arrow in FIG. 1.

The filled casing 24 then extends into a throat 27 of one of the clippers 12 which passes the discharge end of the chute 28 as that clipper 12 moves along a circular path about axis 14. That clipper 12 then gathers the casing material, applies two spaced, U-shaped metal clips about the gathered casing 24, severs the casing 24 between the clips and ultimately discharges the formed casing 24 product or link from the platform 16. As shown in FIG. 1, these actions are effected sequentially by each clipper 12 as the platform 16 moves about the axis 14 to juxtapose each of the clippers 12 at the end of chute 28. In the preferred embodiment, the clippers 12 each operate in the following sequence:

(a) The clipper 12 includes a sliding carriage 70 that moves along a track to position a gate 85 (see FIG. 3) so as to initiate the casing 24 gathering operation. This operation commences when clipper 12 has rotated with platform 16 approximately 52° from the starting point indicated in FIG. 1;

(b) A clipper gathering gate 85 (see FIG. 3) then pivots to gather the casing 24 in a tightly compacted configuration at approximately 68° of rotation of the platform 16;

(c) At approximately 91°, or one quarter turn of the platform 16, a clipper punch 66 is actuated to engage a clip 95 and drive that clip about the casing 24 and against a die 97 to seal the casing 24;

(d) At approximately 164° of rotation of platform 16, a knife 96 severs the casing 24 between parallel closely attached clips 95 to sever a forward link of th product filled casing 24 from the remainder of the casing 24;

(e) At approximately 183° platform 16 rotation the knife 96 is retracted as is the punch 93;

(f) At approximately 222° of platform 16 rotation of the gates 85 and carriage 70 are retracted and the device is readied for further use. Upon retraction of the carriage 70, an ejector mechanism or plate 80 acts to discharge the finished packaged product from the platform 16.

In the embodiment shown, there are fourteen clippers 12 that are equally spaced on platform 16 in a circular array about the axis 14. The clippers 12 are also equally radially spaced from the center axis 14. The clippers 12 may be moved inwardly and outwardly radially in a manner to be explained below. Generally the clippers 12 move in unison inwardly and outwardly toward and away from the axis 14. Alternate clippers 12 may be moved inwardly toward the axis 14 thus eliminating their use in the packaging operation. By adjusting the radius position of the various clippers 12, it is thus possible to change the distance between respective clippers 12 and thus change the length of any link formed from the casing 24 and its contents. The length of any link is variable over a wide range, for example from 4 inches through 28 inches in length of any particular link depending upon the number of stations 12 and their radial position with respect to the axis 14.

In practice, the platform 16 not only rotates about the axis 14, but also the position of the platform 16 may be adjusted with respect to an underframe on which the platform 16 is arranged. This is necessary in order to position the platform 16 and thus the clippers 12 properly with respect to the casing feed construction 18. That is, the discharge chute 28 must be precisely positioned with respect to the clippers 12 in order to eliminate, to the greatest extent possible, stresses on casing 24. This is accomplished by avoiding flexure or bending of the casing 24 to the greatest extent possible. It is for this reason that the arc formed by the chute 28 is a gradual arc and further, the discharge of casing 24 and product from the chute 2 into cooperative relation with the clippers 12 is effected preferably at a tangent. Also, the radius or radial distance of the clippers 12 from the axis 14 is preferably a maximum.

With the device as described, it is possible to effect extremely high speed operation and formation of separate links of sausage-type product continuously inasmuch as the platform 16 continuously rotates and does not operate intermittently. Two hundred to four hundred units of product per minute are possible with the device as described.

Mounting Assembly

Figure 2:
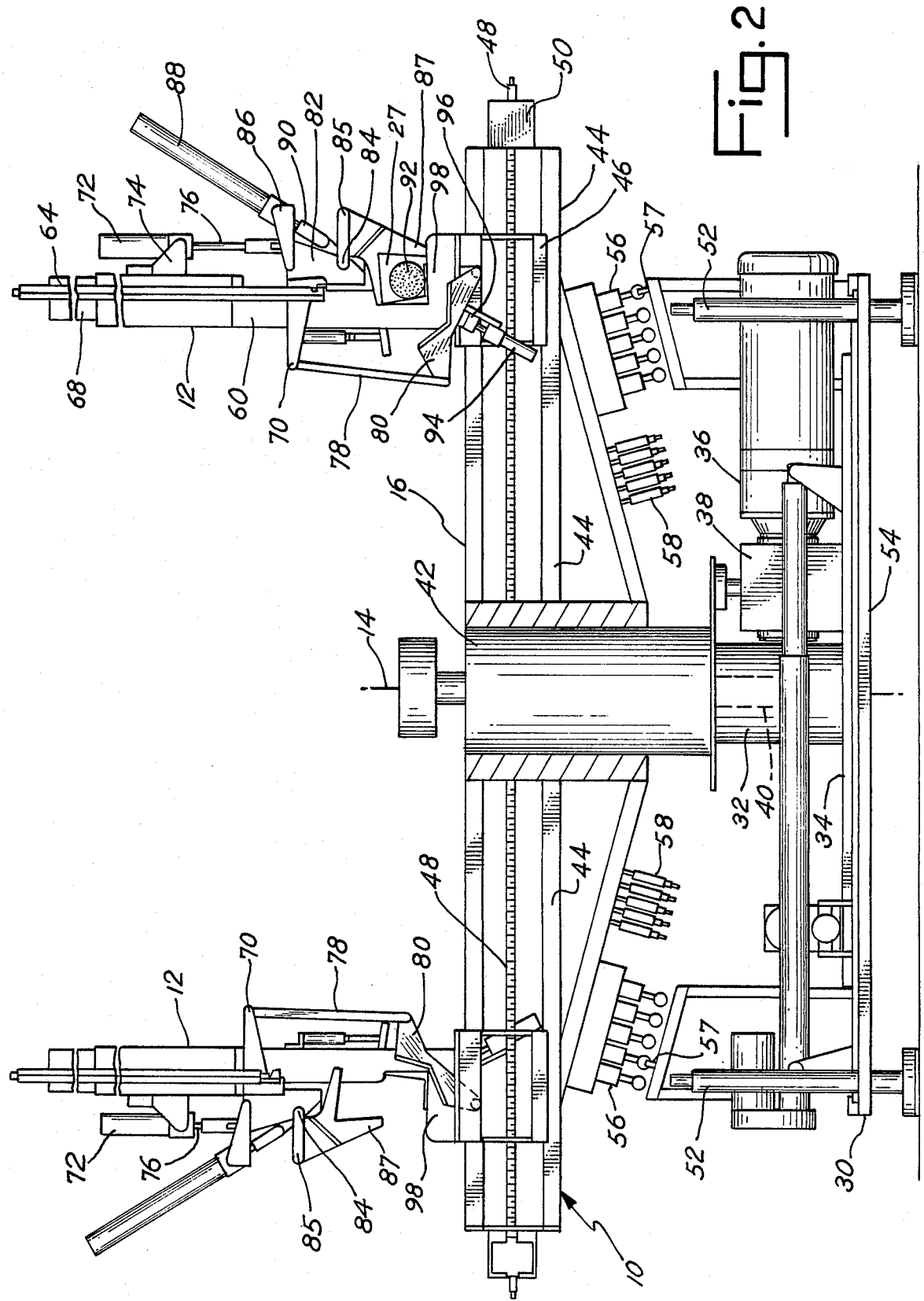
FIGURE 2 is a side cross sectional view of the schematic of FIG. 1 taken substantially along the line 2—2.

FIG. 2 is a side elevation particularly of mounting assembly 10 and clippers 12. Thus, the mounting assembly 10 includes a support frame 30 having a central support post 32. The post 32 is rigidly supported vertically upward by means of the frame 30 and includes brackets or frame members 34 which support a motor 36. The motor 36 has an output shaft which operates through a transmission 38 to engage a vertical drive shaft 40. The shaft 40 connects via a chain drive with a center cylinder post 42 mounted on the post 32. Shaft 40 rotationally drives that center cylinder post 42 in a clockwise direction as depicted in FIG. 1. The motor 36 is a variable speed motor and thus may be operated at any desired speed to effect a desired rotational speed of the cylinder post 42 and the attached platform 16.

The platform 16 is attached to the cylinder post 42 and includes radial arms 44 each of which supports a separate clipper 12. Each arm 44 receives a sliding block 46 through which a threaded rod 48 is fitted. A clipper 12 is mounted on each block 46. By rotation of the threaded rod 48, it is possible to adjust the radial distance of the block 46 and thus the radial distance of the clipper 12 with respect to the center axis 14 of the platform 16.

The construction of the rod 48 and the mechanism for rotating the rod 48 may be such that the rods 48 associated with each clipper 12 are mechanically or electrically interconnected. Thus, for example, if rod 48 is driven by a motor 50, the motor 50 may be a synchronous motor synchronized to operate in unison with similar motors associated with the other clippers 12. In this manner the precise position of each of the blocks 46 may be controlled so that the clippers 12 will all be at the same radial distance from the axis 14 during the operation of the device.

The frame 30 includes adjustable height legs 52 which enable the entire assembly 10 to be raised or lowered to a desired position. Further, the bracket members 34 associated with support of the post 32 and motor 36 are slidably mounted on brackets 54 supported by the legs 52. In this manner the entire platform 16 may be adjusted in a horizontal plane in order to orient the device properly, for example, with the casing feed mechanism or construction 18.

Supported by each arm 44 are a series of pneumatic valves 56. Each valve is associated with a pneumatic cylinder which incorporated as part of the associated clipper 12 mounted on that arm 44. Pneumatic pilot valves 58 are also positioned on each arm 44 and incorporated in the pneumatic control circuit for valves 56. The valves 56, 58 are each interactive with a separate cam actuator 57 supported by the members 34 and more particularly by brackets 59 suspended beneath the rotating arms 44. Thus, as the valves 56, 58 sweep over the cam actuators 57 projecting in their path, the valves 56, 58 will be selectively actuated to effect an operation of the pneumatic clipper 12 positioned on that arm 44.

Note that each arm 44 maintains its own independent set of valves 56 and 58 for operation of the associated clipper 12. Note also that each set of valves 56 and 58 will be thrown or actuated by engagement with one cam actuator 57 supported on the brackets 59 beneath the arms 44. In this manner, regardless of speed of rotation of the platform 16 and regardless of the number or position of the clippers 12, the actuation, operation and sequence of operation of the clippers 12 will always be the same for each and every clipper 12 as it rotates with the platform 16.

Clipper Construction

Figure 3:
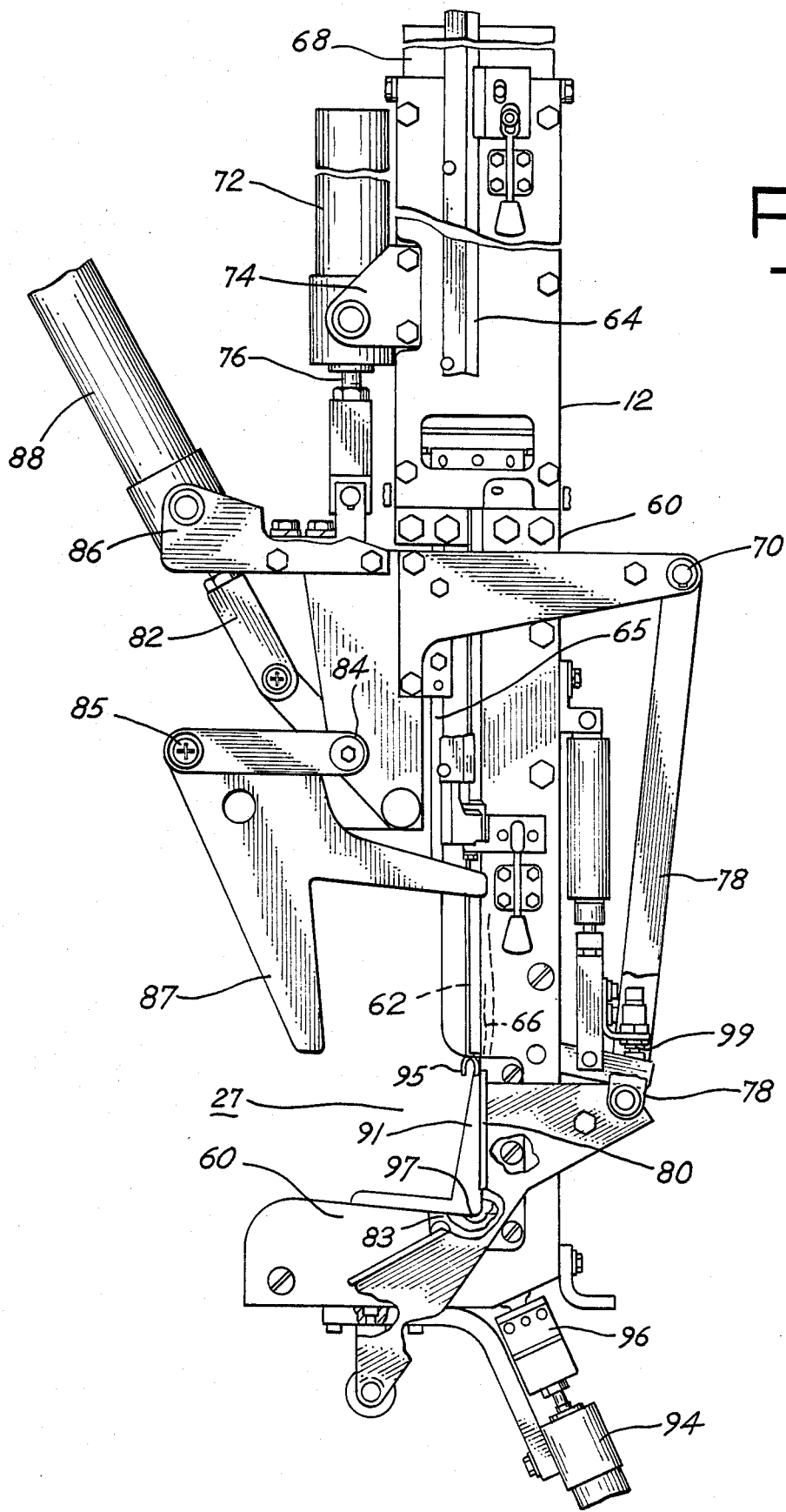
FIG. 3 is a side elevation of a clipper utilized in the packaging device of the invention.
Figure 4:
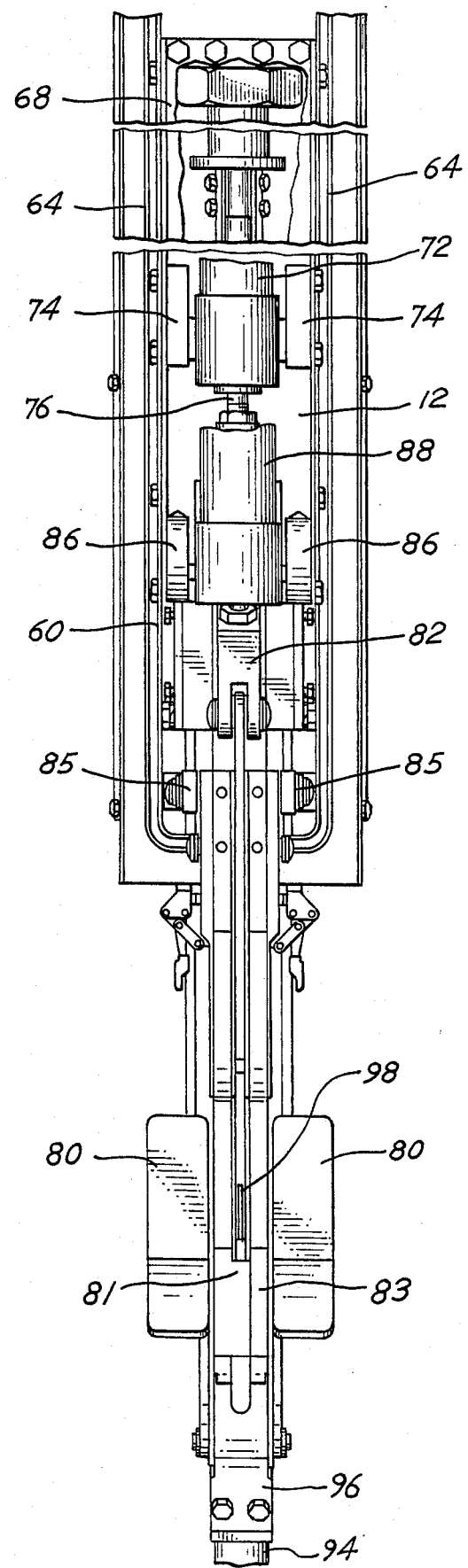
FIG. 4 is a front elevation of the clipper of FIG. 3.

FIGS. 3 and 4 illustrate in greater detail the construction of each clipper 12 mounted on each block 46. Each clipper 12 has a substantially identical construction. However, it should be noted that the construction of the clipper 12 as described is not a limiting feature of the invention. That is, any of a number of a type of double clippers may be utilized in the practice of the invention by mounting such clippers 12 on the blocks 46, for example. There is described, however, a preferred embodiment of a clipper 12.

Each clipper 12 is a double clipper and includes a single main vertical mounting plate 60. The plate 60 is attached to the block 46 and defines two vertical clip channels 62. The channels 62 are generally parallel. Each channel 62 is designed to receive a separate clip. Each channel 62 has simultaneous operation. Each channel 62 defines a partial pathway for a clip driven by a punch 66. Thus, each channel 62 is partially open at its lower end to define a throat 27 for receipt of casing 24. The throat 27 is closed and defines a fully closed channel whenever a gate 85 is rotated to the closed position as described below. Die blocks 81, 83 are situated at the end of each channel 62. Clip rails 64 direct clips from a clip storage assembly (not shown) through an appropriate window into each clip channel 62.

Since the clipper 12 is a double clipper, it includes a pair of parallel channels 62 and a pair of rails 64 on the outside of those channels 62 for attachment simultaneously of two narrowly spaced U-shaped metal clips about casing 24. Thus, within each clip channel 62 is a slidable punch 66 driven in response to actuation by a pneumatic cylinder 68.

Mounted on the outside of the plate 60 and slidable in a vertical track 65 in the plate 60 is a carriage 70. Carriage 70 moves in response to actuation of a cylinder 72 having a bracket 74 which attaches the cylinder 72 to the plate 1000 in FIG. 3. A rod 76 extends from the cylinder 72 and is attached to the carriage 70 for effecting reciprocal motion of the carriage 70 between a projected and a retracted position. Carriage 70 includes a vertically downward extending arm 78 and a transverse, lower cross member or ejection plate 80 which is supported by the arm 78.

Mounted on a forward bracket 82 attached to the carriage 70 is a pivotal gate 85 which pivots about an axis 84. A cylinder support bracket 86 supports a cylinder 88 on the carriage 70. A rod 90 extending from the cylinder 88 engages the pivotal gate 85 and rotates or pivots the gate 85 between a retracted or throat open position and a casing gathering as well as channel forming position. The punch 66 drives a clip against an appropriate die block 81, 83 to form the clip about casing 24.

Supported by the plate 60 beneath the throat 27 is a knife cylinder 94 which drives a knife 96 through a slot 98 between die blocks 81, 83 which are retained by the plate 60. The knife 96 thus may be extended to engage and cut casing 24 which has been clipped and retained within the throat 27 of the clipper 12.

In operation, as an arm 44 of the platform 16 rotates about axis 14, one of the valves 56 is initially actuated by engaging an appropriate actuator cam 57. The first valve that is engaged upon positioning of casing 24 within the throat 27 is the carriage cylinder 72. Actuation effects lowering the carriage 70 from the retracted to the projected position. Note that when carriage 70 is retracted, casing 24 can be easily positioned in throat 27. When carriage 70 is projected or lowered, however, the gate 85 and more particularly the leg 87 fits over throat 27 so casing 24 is retained. In review, when the carriage 70 is in the retracted position the throat opening 27 is totally exposed thereby permitting placement of the filled casing 24 within the throat opening 27.

Lowering of the carriage 70 by operation of the carriage cylinder 72 is subsequently followed by actuation of the gate cylinder 88. This pivots the gate 85 about the axis 84 thereby compressing the casing 24. The casing 24 is firmly compressed so that a clip may be driven down the channel 62 about the casing 24.

In practice this is a double clipper, a pair of clips are driven by actuation of the cylinder 68. The clips go down the channel 62 and are formed against dies defined in blocks 81, 83. Subsequently, the knife cylinder 94 is actuated to thereby operate the knife 96 and cut the casing 24 between the formed clips which have been fastened about the casing 24 by actuation of the punch 66.

Cam actuators 57 then engage the reset valves 58 and reverse the sequence of operation. Namely, the cylinder 94 is retracted. This retracts the knife 96. Subsequently the cylinder 68 is retracted to thereby retract the punches 66. Next, cylinder 88 is reversed to pivot gate 85 to the open position. Finally, the carriage cylinder 72 is actuated to retract the carriage 70. Retraction of the carriage 70 causes the discharge plate 80 to be elevated and engage the casing 24 or more particularly the link which has been formed causing the link to be discharged forward and outward from the rotating platform 16.

Note that the throat 27 extends radially outwardly from the platform 16. This is an important factor of the invention in that it permits direction of filled casing 24 from a tangent direction external the platform 16 into the clipper 12.

An important feature of the invention is the utilization of a limit valve 99 which senses the presence of casing material between the gate 85 and plate 60. That is, the compressed casing 24 will cause gathering plates 91 positioned adjacent the die blocks 81, 83 to translate into engagement with a limit valve 99. That limit valve 99 must be actuated in order to open the fluid pressure line to the cylinder 68. The gathering plates 91 will only move or be translated to actuate the described valve 99 in the event there is sufficient casing 24 in the opening between the gathering plate 60 and the movable gathering plate 85.

Casing Feed Construction

FIGS. 5 and 6 illustrate in greater detail the casing feed construction 18 which includes the horn 22 and the channel or chute 28. The construction 18 is mounted on a frame 100 supported on a wheeled carriage 101. A foot 102 is provided to hold the carriage 101 and frame 100 in a fixed position relative to the other components of the system.

The horn 22 mounted on the end of a stuffing mechanism 20 from which product is discharged. The feed construction 18 includes a brake mechanism 26 such as known to those skilled in the art. Brake mechanism 26 is supported by a bracket 108 supported by or on a plate 110. The plate 110 is adjustably supported by adjustable legs 112.

Shirred casing 24 is fitted over the horn 22. The forward end of the casing 24 is closed or sealed and the brake 26 is then moved or brought into cooperation with the casing 24 against the horn 22. Product which flows through the horn 22 will flow into the casing 24 and withdraw the casing 24 from the horn 22 in a controlled manner as determined by the brake 26. The filled casing 24 will then flow down the arcuate chute or channel 28. Note that the channel or chute 28 has a semi-cylindrical shape or cross section at its discharge or arcuate end 21 of the chute 28 which is open at the top; whereas the forward cylindrical straight portion 23 of the chute 28 totally encircles or encloses the product.

It is possible to vary the construction of the invention while maintaining the functions and attributes as described. The invention is therefore to be limited only by the following claims and their equivalents.

What is claimed is:

1. An improved packaging device for filling flexible casing and sealing discrete lengths of filled casing comprising, in combination:
   a clipper mounting assembly including a floor mounted frame and a platform supported by the frame, said platform rotatable in a horizontal plane relative to the frame;
   a plurality of clippers mounted on the platform, each clipper spaced radially from a vertical axis through the platform, each clipper including means for attaching a clip about filled casing by gathering said casing and subsequently forming a U-shaped clip about the gathered casing with cooperative punch and die means, each of said clippers extending radially outwardly from its axis on the platform;
   means for continuously rotating the platform and clippers mounted thereon about said axis in a uniform direction;
   means positioned at one side of the platform for feeding continuously filled casing sequentially into each clipper as each one of said clippers moves, by platform rotation, past the means for feeding; and
   means for sequentially operating the clippers as the platform is rotated whereby as each clipper is in position to receive filled casing as it moves past the means for feeding, said clipper operates to subsequently gather the casing, to form a U-shaped metal clip about the casing, to separates separate links of casing, to release the casing link and discharges the filled link from the platform.

2. The device of claim 1 including means for translating the platform relative to the frame to thereby position the clippers relative to the means for feeding.

3. The device of claim 1 including fourteen clippers arrayed generally radially about a common axis on the platform.

4. The device of claim 1 wherein the clippers are each individually movable in the radial direction along a radius from their associated axis on the platform.

5. The device of claim 1 including means to simultaneously move alternate clippers equal radial distances on the platform toward or away from a common vertical axis of rotation for the platform.

6. The device of claim 1 wherein the platform comprises a generally planar table, said table including a plurality of slots extending generally outward from the center of the platform, one of said clippers mounted in each slot on a mounting block, and means for translating the block in the slot.

7. The device of claim 1 wherein at least one clipper includes a body, a clip channel in the body, a punch in the clip channel movable between a projected and a retracted position, a die at the end of the clip channel adjacent the platform, means for directing a clip into the channel, a movable gathering gate carriage mounted on the body and movable between a projected position adjacent the die and a retracted position; said carriage including gate pivotal between a casing gathering position and a casing release position, and means for driving the punch, the carriage and the gate between their respective extreme positions.

8. The improved device of claim 1 wherein the means for feeding includes a horn for receipt of shirred casing, said horn having a product discharge end, brake means at the discharge end of the horn for controlling the release of casing from the horn, a casing control chute downstream from the discharge end of the horn for directing filled casing to a clipper on the platform, said control chute maintaining the filled casing generally tangent to the path of travel of the clippers as said casing is fed into one of the clippers.

9. The device of claim 8 wherein the control chute is arcuate.

10. The device of claim 9 wherein the chute discharges in the direction of rotation of the platform.

11. The device of claim 7 wherein the carriage includes an arm extending below the die when th ®carriage is in the projected position and movable with the carriage to engage casing and eject casing from the region of the die when in the retracted position.

12. The device of claim 7 wherein said clipper is a double casing material.

13. The device of claim 12 including a knife affixed to the body and movable to cut casing between adjacent clips.

14. The device of claim 7 including means for sensing gathered casing in the gate, said means for sensing connected to the means for driving the punch through control means to effect operation of said means for driving.

15. An improved clipper for attaching U-shaped metal clips to gathered material, said clipper comprising, in combination:
   a body plate for supporting the clipper;
   a clip channel in the plate, said plate defining an open throat to receive gathered material and a die at the opposite end of the channel to form a U-shaped metal clip about gathered material;
   as punch in the channel for driving a clip;
   means for driving the punch between a projected and a retracted position;
   means for feeding clips, one at a time, into the channel;
   a carriage slidably mounted on the body and movable in the direction of the punch between a retracted position to expose the throat and a projected position over the throat at least in part;
   a pivotal gate mounted on the carriage and pivotal between a retracted position to expose the throat and a projected position to gather casing material in the throat for placement of a clip thereover;
   means for translating the carriage;
   means for pivoting the gate and
   a product ejector plate attached to the carriage and movable therewith between a position for engaging and ejecting product from the die and a position of disengagement with such product.

16. The improved clipper of claim 15 wherein the ejector comprises a plate supported on an arm attached to the carriage.

17. The clipper of claim 15 including means for voiding the interior of a casing as said casing is gathered for attachment of a clip thereto.

18. An improved packaging device for filling flexible casing and sealing discrete links of filled casing comprising, in combination:
   a clipper mounting assembly including a floor mounted frame and platform supported by the frame;
   at least one clipper mounted on the platform, said clipper spaced radially from a vertical axis through the platform, said clipper including means for attaching a clip about filled casing by gathering said casing and subsequently forming a U-shaped clip about the gathered casing with cooperative punch and die means, said clipper mounted radially outward from its axis on the platform;
   means for continuously rotating the platform and clipper mounted thereon in a generally horizontal plane about said axis in a generally uniform direction;
   means positioned at one side of the platform for feeding continuously filled casing sequentially into said clipper as said clipper moves, by platform rotation, past the means for feeding; and
   means for sequentially operating the clipper as the platform is rotated to receive filled casing, to subsequently gather the casing and then form a U-shaped metal clip about the casing, and finally, to release the casing from the clipper.

19. An improved packaging device for filling flexible casing and sealing discrete lengths of filled casing comprising, in combination:
   a clipper mounting assembly including a floor mounted frame and a platform supported by the frame, said platform rotatable in a horizontal plane relative to the frame;
   a plurality of clippers mounted on the platform, each clipper spaced radially from a vertical axis through the platform, each clipper including means for attaching a clip about filled casing by gathering said casing and subsequently forming a Uk-shaped clip about the gathered casing with cooperative punch and die means, each of said clippers extending radially outwardly from its axis on the platform;
   means for continuously rotating the platform and clippers mounted thereon about said axis in a uniform direction;
   means positioned at one side of the platform for feeding continuously filled casing sequentially into each clipper as each one of said clippers moves, by platform rotation, past the means for feeding;
   means for sequentially operating the clippers as the platform is rotated whereby as each clipper is in position to receive filled casing as it moves past the means for feeding, said clipper operates to subsequently gather the casing, to form a U-shaped metal clip about the casing, to separate links of casing, to release the casing link and to discharge the filled link from the platform;
   said means for feeding including a horn for receipt of the chute casing, said horn having a product discharge end, brake means at the discharge end of the horn for Controlling the release of casing from the horn, a casing control chute downstream of the discharge end of the horn for directing filled casing to a clipper on the platform, said control feed maintaining the filled casing generally tangent to the path of travel of the clippers as said casing is fed into one of the clippers.

* * * * *